(12) United States Patent
Dean

(10) Patent No.: US 6,732,993 B2
(45) Date of Patent: May 11, 2004

(54) MOLD FOR MAKING CONTACT LENSES

(75) Inventor: Gregg A. Dean, St. Denys (GB)

(73) Assignee: Ocular Sciences, Inc., Concord, CA (US)

( * ) Notice: Subject to any disclaimer, the term of this patent is extended or adjusted under 35 U.S.C. 154(b) by 112 days.

(21) Appl. No.: 10/037,567

(22) Filed: Nov. 9, 2001

(65) Prior Publication Data

US 2002/0056801 A1 May 16, 2002

Related U.S. Application Data

(62) Division of application No. 09/533,319, filed on Mar. 22, 2000, now Pat. No. 6,383,419.
(60) Provisional application No. 60/169,753, filed on Dec. 9, 1999.

(51) Int. Cl.[7] .............................................. B29D 11/00
(52) U.S. Cl. ........................................ 249/117; 425/808
(58) Field of Search .......................... 249/117; 425/808; 264/2.1

(56) References Cited

U.S. PATENT DOCUMENTS

| | | | |
|---|---|---|---|
| 4,383,672 A | | 5/1983 | Kreuttner |
| 5,200,121 A | | 4/1993 | Hagmann et al. |
| 5,252,056 A | * | 10/1993 | Horner et al. ............... 425/555 |
| 5,254,000 A | * | 10/1993 | Friske et al. ................ 425/595 |
| 5,611,970 A | | 3/1997 | Apollonio et al. |
| 5,916,494 A | | 6/1999 | Widman et al. |
| 5,968,422 A | * | 10/1999 | Kennedy .................... 264/1.1 |

* cited by examiner

*Primary Examiner*—James P. Mackey
*Assistant Examiner*—Donald Heckenberg
(74) *Attorney, Agent, or Firm*—Stout, Uxa, Buyan & Mullins, LLP; Frank J. Uxa

(57) ABSTRACT

Methods of cast molding toric contact lenses are provided including the steps of providing a first contact lens mold section; providing a molding apparatus and an insert tool adapted to be fixed to the molding apparatus at a plurality of different rotational orientations relative to the molding apparatus; fixing, at one of a plurality of different rotational orientations relative to the molding apparatus, the insert tool in a molding apparatus and producing a second mold section in the molding apparatus with the insert tool fixed thereto, wherein the second mold section includes a contour which corresponds to a toric optical zone of a contact lens; assembling the first and second mold sections; and cast molding a toric contact lens product between the mold sections. Sets of mold sections useful for molding toric contact lenses as provided.

7 Claims, 3 Drawing Sheets

MOLD FOR MAKING CONTACT LENSES

This is a division of Application Ser. No. 09/533,319, filed Mar. 22, 2000. now U.S. Pat. No. 6.383,419 which claims the benefit of Provisional Application Serial No. 60/169,753 filed Dec. 9, 1999, the disclosure of which is incorporated in its entirety hereby by reference.

BACKGROUND OF THE INVENTION

The present invention generally relates to the manufacture of contact lenses and more specifically relates to methods for cast molding toric contact lenses with a toric optical zone on a surface, for example, on a posterior surface, and preferably a spherical correction on a surface, for example, on an anterior surface.

BACKGROUND OF THE INVENTION

Contact lenses having a toric optical zone (commonly referred to as "toric contact lenses") are commonly used to correct refractive abnormalities of the eye relating to astigmatism. Astigmatism may be associated with other refractive abnormalities, such as myopia (nearsightedness), and hypermetropia (farsightedness), presbyopia and the like and therefor toric contact lenses can be prescribed with one or more spherical corrections. Both back toric lenses (having a toric surface formed in the posterior lens surface) and front toric lenses (having a toric surface formed in the anterior lens surface) are presently available.

A toric lens for astigmatism and to correct myopia, hypermetropia, presbyopia and/or one or more other refractive abnormalities will have prescription variables not only for spherical correction but also for toric correction and axis of toric correction. Typically a toric contact lens prescription is available with a toric orientation, (also known as a cylindrical axis) of between 0° and 180°, and usually in increments of no less than 5° or 10°. Whereas spherical contact lenses may freely rotate on the eye, toric contact lenses typically include a ballast, for example, thickened lens section, to inhibit rotation of the lens on the eye such that the cylindrical axis of the toric zone remains generally aligned with the axis of the astigmatism. Thus, the relative orientation of the toric zone or region and the ballast region must be controlled during the contact lens manufacturing process.

A method of manufacturing toric contact lenses is described in Apollonio et al, U.S. Pat. No. 5,611,970, which is incorporated in its entirely herein by reference. In the referenced patent, a toric contact lens is manufactured by using a mold assembly comprising two mold sections. One of the sections defines a contour that corresponds to a ballast section of the lens and another of the mold sections defines a contour corresponding to a toric section of the lens. The two mold sections form a cavity into which a curable mixture of polymerizable monomers is deposited, which will become the material of the molded lens. In accordance with the Apollonio et al patent, the mold sections are placed together and rotated to a specific angle which will define the specific, prescribed "offset" of the toric section in the lens. In order to manufacture a contact lense having a prescribed axis of toric correction, it is conventional that anterior and posterior mold sections are adjustable at multiple rotational positions with respect to one another to align the mold sections at a rotational position corresponding the selected rotational angle. For example, among other variables, the anterior mold half may define the ballast section of the lens and the posterior mold half may define the degree of toric correction.

Thus, during mold assembly, the mold halves are rotated with respect to each other at a desired angle of rotation, to produce a lens having the desired toric orientation.

In conventional cast molding techniques, each mold section is produced by injection molding techniques. A mold insert tool, for example made of metal, ceramic and the like, is provided and secured or fixed in an injection molding machine. A mold section is then produced having the contour of the insert. Thus, the mold section may include a negative impression of, or a contour which corresponds to, a toric zone of a contact lens to be produced from the mold. Similarly, another insert tool is used to produce the opposing mold section, which may include a negative impression of, or a contour corresponding to, a ballast section and preferably the spherical correction, if any, of the contact lense to be produced. The inserts may be used repeatedly in the molding machine in order to produce many identical mold sections or halves.

As disclosed in the above-noted Apollonio et al patent, in order to produce a contact lens, an anterior mold section and a posterior mold section are assembled together after being rotated with respect to each other to the desired degree of offset between the toric area and the ballast section. After polymerization of the monomer or precursor material located in the cavity formed by the assembled mold sections, which polymerization may be initiated by using heat and/or light and/or other energy, the unfinished contact lens product is removed from the mold, while destroying the mold. The contact lens product is finished into a final contact lens using techniques known in the art. One concern with this method is the relative ease with which an error can be made in rotating the mold sections relative to each other. Such an error results in a lens being produced which is not the desired or correct lens. Moreover, if such error occurs, it is likely to be discovered only after the lens product is formed and the mold sections destroyed. Thus, the entire method must be repeated, increasing the cost of producing toric contact lenses.

It would be advantageous to provide a method for producing toric contact lenses which does not rely on relative rotation of the mold halves or sections to properly orient the toric zone and ballast.

SUMMARY OF THE PRESENT INVENTION

New methods for cast molding toric contact lenses and sets of mold sections useful in molding contact lenses have been discovered. The present invention provides ease of manufacturing without the need for complex machinery to align the mold sections prior to assembly or for manufacturing specific tooling for each axis orientation required. The present invention provides mold sections which are easily assembled in the proper rotational orientation. Relative rotation of the mold sections is not required to provide contact lenses having the proper or desired toric zone/ballast orientation.

In a broad aspect of the invention, methods of cast molding a contact lens include the steps of providing a first contact lens mold section, preferably for example, including a negative impression of, or a contour corresponding to, a ballast section or portion of a contact lens; providing a molding apparatus and insert tool to be fixed in the molding apparatus at a plurality of different rotational orientations relative to the molding apparatus; fixing, at one of a plurality of different rotational orientations relative to the molding apparatus, the insert tool in the molding apparatus and producing a second mold section in the molding apparatus with the insert tool fixed thereto. This second mold section includes a negative impression of, or a contour corresponding to, a toric optical zone of a contact lens. The first and second mold sections are assembled.

A polymerizable contact lens material or a contact lens precursor material, for example, a polymer precursor composition conventionally used to produce contact lenses, is provided between the first mold section and the second or toric mold section. The contact lens precursor material, e.g. a monomeric material, is polymerized, for example, by using heat and/or light or other suitable means or energy, between the mold sections to produce a contact lens product. The contact lens product is removed from the first and second mold sections. The first and second mold sections are often destroyed during this removal step. The contact lense product is often an unfinished contact lens which is subjected to one or more finishing steps, for example, conventional finishing steps, to produce the final toric contact lens.

Preferably, the first mold section and the second or toric mold section are adapted to be assembled in only a single rotational orientation, thus substantially eliminating errors in assembling the mold sections. In this embodiment, the assembling step provides the first and second mold sections in a single rotational orientation in which the mold sections can be aligned.

In another broad aspect of the invention, sets of mold sections useful in molding contact lenses. The present sets comprise a first contact lens mold section, preferably including a contour which corresponds to a ballast portion of a contact lens and/or a contour which corresponds to a desired spherical vision correction zone of a contact lens; and a second or toric contact lens mold section including a contour which corresponds to a toric optical zone of a contact lens. The first mold section and the second mold section are adapted to be assembled in only a single rotational orientation. In one very useful embodiment, the set of mold sections comprise a plurality of the first contact lens mold sections, and a plurality of the second contact lens mold sections. In this embodiment, each of the second mold sections is different. In particular, the rotational orientation of the contour which corresponds to a toric optical zone of a contact lens of each second mold section in an assembled first mold section/second mold section combination is different.

Preferably, the first and second mold sections include corresponding forms, such as mating forms, corresponding flats and the like, adapted to at least facilitate assembling and/or locking the first and second mold sections in the single rotational orientation.

The present methods can be employed to produce the present sets for mold sections.

Each and every feature described herein, and each and every combination of two or more of such features, is included within the scope of the present invention provided that the features included in such a combination are not mutually inconsistent.

These and other features, aspects and advantages of the present invention will become apparent hereinafter, particularly when considered in conjunction with the following claims, detailed description and accompanying drawings, in which like parts bear like reference numerals.

DETAILED DESCRIPTION

Figure 1A:
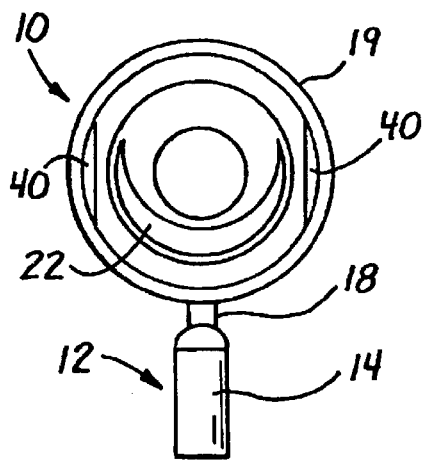
FIGS. 1a and 1b show front view representations of an anterior insert tool and a posterior insert tool, respectively, in which the posterior insert tool is rotationally positioned in a molding machine in a position selected for manufacture of a toric contact lens having a 90° axis of cylindrical correction.

In accordance with the present invention, new methods of cast molding toric contact lenses and sets of mold sections useful in molding contact lenses are provided.

The present methods of cast molding a contact lens are generally described elsewhere herein.

The first and second mold sections may be produced by conventional molding techniques. The first mold section, for example, the anterior mold section, preferably includes a contour corresponding to a ballast section or portion of a contact lens, and may include a contour corresponding to a desired spherical correction of the contact lens. The step of producing the second mold section, for example, the posterior mold section, including a contour of a toric zone of a contact lens, includes the steps of providing an insert tool defining the desired toric contour of a contact lens, rotationally orienting the insert tool at a specific, predetermined rotational angle in the molding apparatus, for example, with respect to a reference form or point in the molding apparatus; securing or fixing the insert in the molding apparatus; and injecting a moldable material into the molding apparatus. The second or toric mold section is removed from the molding apparatus.

It will also be appreciated that a single insert tool may be used to form multiple, different second or toric mold sections having different rotational axes, for example, in increments of about 5° or about 10°, from 0° to 180°.

The insert tools for injection molding of the first and second mold sections are typically made from metal, such as brass, stainless steel or nickel, or some combination thereof. Machining may be used to provide the toric surface on the insert tool. Such machining of the tool, and polishing of the resulting toric surface, can be done using conventional and well known techniques.

The insert tool may be secured or fixed in the molding apparatus, for example, using conventional techniques.

After the first and second mold sections are provided, the mold sections are assembled.

When the mold sections are assembled, a mold cavity is formed between the two defining surfaces that correspond to the desired shape and, importantly, an axial orientation of the final contact lens to be produced. Because the step of producing the second mold section provided for rotation of the insert tool within the molding apparatus, a specific toric axis orientation is provided by the second mold section. Advantageously, in accordance with the method of the present invention, there is no need for adjusting rotational alignment of the first and second mold sections to correspond with the selected offset between the cylindrical axis and the ballast. In a more specific aspect of the invention, the first and second mold sections are matingly engageable to one another or assembled together in only one position. In other words, the mold sections may be assembled and/or locked together in only one rotational position or orientation.

A contact lens precursor material, for example, a polymer precursor composition, such as a mixture of monomeric components, conventionally used to produce contact lenses, is provided in a cavity formed between the two mold sections. The material is polymerized and/or cured, producing a contact lens product, often an unfinished contact lens. The contact lens product is removed from the mold sections and may be processed into a final contact lens using techniques known in the art.

Although not considered part of the present invention, finishing the contact lens product may include processing steps such as final lens machining, lens inspection, hydration in the case of hydrogel contact lenses, and lens packaging.

It is noted herein that the anterior mold section may define the toric portion of the lens and the posterior mold section may define the ballast section or portion of the lens. The ballast portion of the lens may be any feature or combination of features on or in the lens effective to substantially maintain the rotational orientation of the toric portion when the lens is located in the eye. The ballast portion may be a thickened portion, although other forms, many of which are conventional and well known in the art, may be employed in accordance with the present invention. Also, one or more spherical corrections, if any are desired to be included in the lens to be produced, may be defined by the posterior mold and/or the anterior mold. For example, the lens to be produced may have no spherical correction, one spherical correction, two spherical corrections (bifocal) or more than two spherical corrections (multifocal).

For the sake of simplicity, in the following specific description, the anterior mold section will be considered as defining, that is including contours corresponding to, the ballast portion of the lens and the single spherical correction of the lens, and the posterior mold section will be considered as defining, that is including a contour corresponding to, the toric zone or portion of the lens.

The second, posterior contact lens mold section preferably is produced in a manner that ensures that it is alignable with the first, anterior mold section in only one angular or rotational orientation with respect thereto. More specifically, in FIGS. 1a and 1b, when the mold sections are produced as shown with a long, flat meridian disposed from a top to a bottom of the lens on the eye, the axis of toric orientation produced would be axis 90°. Due to the mold shape, the non-lens portions of the mold sections may be made with non-rotationally symmetric flats or other forms so that the first and second mold sections may only be assembled in one angular or rotational orientation.

Figure 2A:
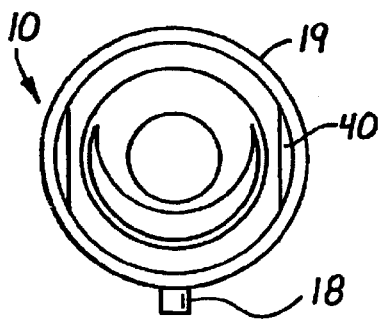
FIGS. 2a and 2b show front view representations of an anterior insert tool and a posterior insert tool, respectively, in which the posterior insert tool is rotationally positioned in the molding machine in a position selected for manufacture of a toric contact lens having a 135° axis of cylindrical correction.
Figure 3A:
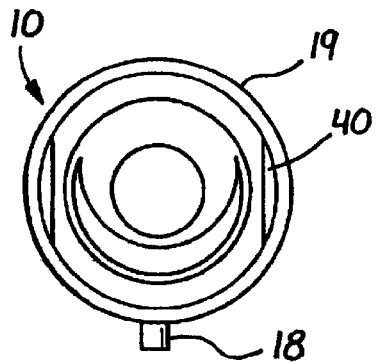
FIGS. 3a and 3b show front view representations of an anterior insert tool and a posterior insert tool, respectively, in which the posterior insert tool is rotationally positioned in the molding machine in a position selected for manufacture of a toric contact lens having a 180° axis of cylindrical correction.
Figure 5A:
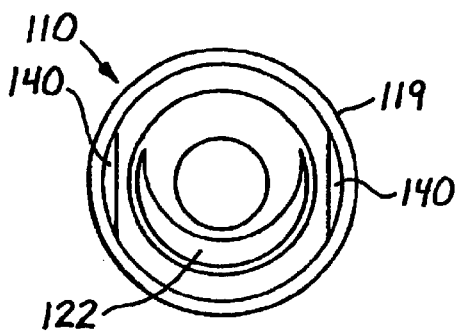
FIGS. 5a and 5b show front or inside view representations of an anterior mold section and a posterior mold section, respectively, in which the posterior mold section is structured for the manufacturer of a toric contact lens having a 90° axis of cylindrical correction.
Figure 6A:
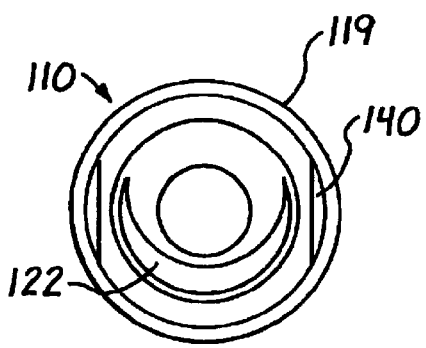
FIGS. 6a and 6b show front or inside view representations of an anterior mold section and a posterior mold section, respectively, in which the posterior mold section is structured for the manufacturer of a toric contact lens having a 45° axis of cylindrical correction.
Figure 7A:
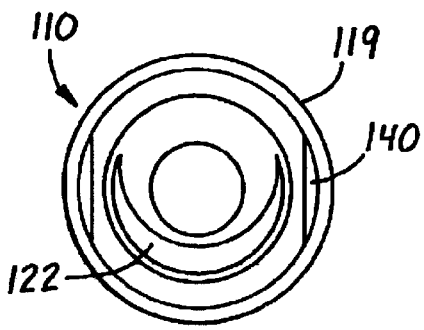
FIGS. 7a and 7b show front or inside view representations of an anterior mold section and a posterior mold section, respectively, in which the posterior mold section is structured for the manufacturer of a toric contact lens having a 180° axis of cylindrical correction.

A specific embodiment of a method in accordance with the present invention may be performed as hereinafter described. First, a posterior insert tool and an anterior insert tool are provided, wherein the posterior insert tool defines a desired toric zone and the anterior insert tool includes a contour that provides a ballast zone, for example, a thickened ballast zone, and preferably a spherical optical correction. The anterior insert tool is placed within conventional injection molding apparatus such that the anterior mold section is produced with the gate centered on the bottom of the ballast section as shown in FIGS. 1a, 2a and 3a. The three anterior mold sections 110 are shown in FIGS. 5a, 6a and 7a. Each of these anterior mold sections 110 is substantially identically structured.

Figure 1B:
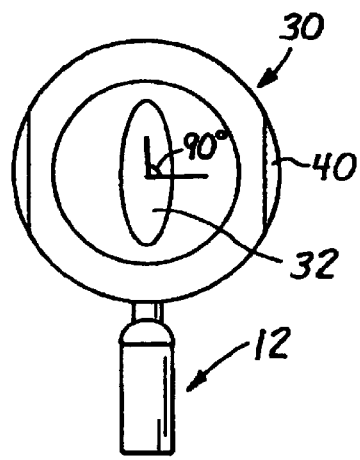
Figure 2B:
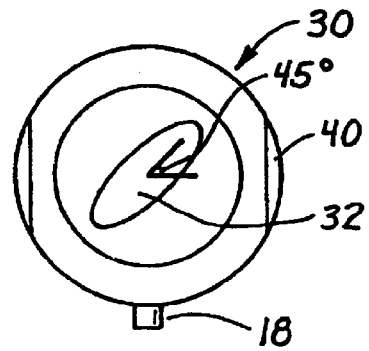
Figure 3B:
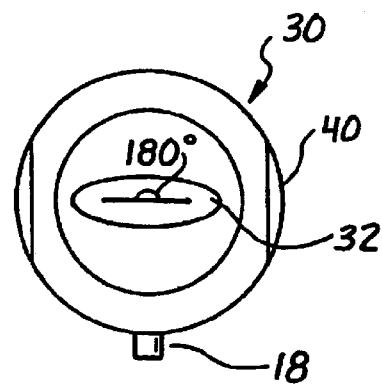
Figure 5B:
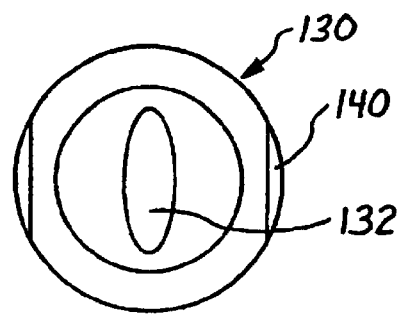
Figure 6B:
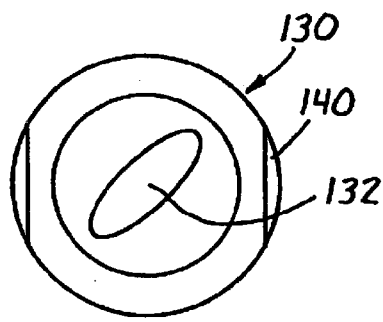
Figure 7B:
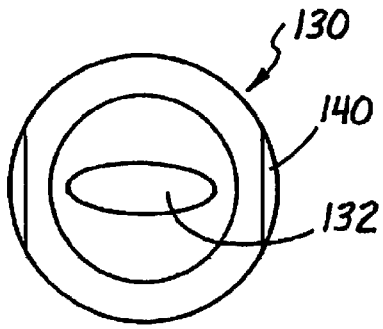

The posterior insert tool is fixed in a molding machine such that the toric axis is oriented in the molding machine at a specific predetermined angle, for example, a 90° angle, a 45° angle or a 180° angle as shown in FIGS. 1b, 2b, and 3b, respectively with respect to a fixed reference point, such as the gate. Thus, three different posterior mold sections are produced with three different angles of toric orientation by rotating the posterior insert tool in the molding machine and then fixing the insert in the machine at the desired angle. These three different posterior mold sections 130 are shown in FIGS. 5b, 6b and 7b. The present invention preferably provides for creation of anterior and posterior mold sections that can be aligned only at a specific, predetermined angle with respect to each other.

Thus, unlike conventional techniques, the present invention eliminates any need to rotate the two mold sections with respect to each other to produce the prescribed toric orientation in the final lens. In other words, rather than aligning the mold sections at different rotational orientations to produce the lens having the desired toric orientation, the present invention provides a pre-molding step of aligning the posterior insert tool (or anterior insert tool) at a specific predetermined angle with respect to a fixed form (such as the gate through which the molding material flows), and therefor producing a mold section that has a known rotational axis. Production of a contact lens having a specific toric orientation does not therefor involve any rotation of the mold halves or sections with respect to each other. Preferably, the mold halves can only be aligned or locked in only one, specific, predetermined angular alignment with respect to each other to produce a contact lens having the predetermined, desired toric orientation. Structural features or forms, such as flats and the like, may be provided on the non-lens portions of the mold sections to ensure that the mold sections can be aligned in only a single rotational orientation.

It is to be appreciated that the method of the invention may be implemented without the need to design the mold pair with structural features or forms such that the mold pair will close in only one orientation. For example, the single, correct alignment could be guaranteed by robotic or other automatic placement techniques. Thus, a mold pair in accordance with the present invention including no "locating" features or forms can be automatically closed in the correct orientation to provide the desired toric contact lens. However, it is preferred that the mold pair be produced including such structural features or forms so that the mold pair can be assembled in only a single rotational orientation.

Using the identical anterior mold sections, contact lenses having different toric axises can be produced. Different posterior molds may be produced with different toric axes.

As a specific example shown in FIGS. 1a, 2a and 3a, an anterior insert 10 is shown as fixed within a molding apparatus 12 having an injection molding assembly 14 including a gate 18 where molding material enters a molding cavity. The injection molding apparatus 12 may be of conventional design. The position of the gate 18 in the molding apparatus is fixed and therefor may be used to provide a point of reference for correctly aligning the tool within the molding apparatus.

When molding the anterior mold sections 110, the anterior insert 10 is placed in the molding apparatus such that ballast portion 22 is centered with respect to the gate 18 as shown. The three anterior mold sections 110 shown in FIGS. 5a, 6a and 7a can be considered a "set" of anterior molds.

On the other hand, to produce a posterior mold section 130, a posterior insert 30 including the contours of toric zone 32 is rotated to, and aligned and fixed in the apparatus 12 at a particular, predetermined angle of rotation. For example, as shown in FIGS. 1b, 2b and 3b, the posterior insert 30 has been fixed within the molding apparatus at specific angles of 90°, 45° and 180°, respectively. Thus, three different posterior molds 130, making up a "set" of posterior molds, made from a single posterior insert 30, may be produced, each one being alignable with an anterior mold 110 in a predetermined position. Depending on the posterior mold 130 chosen, a contact lens may be produced having the desired "offset" between the ballast axis and the toric axis by aligning the anterior mold 110 with the posterior mold 130 in a single rotational orientation.

Flats 140 or other mating features or forms, such as tapered edges, grooves, buttons and indents, and the like, may be made on the molds section 110 and 130 to provide for locking the molds sections in the specific, predetermined or single rotational orientation. For example, the flats 140 on the anterior mold section 110 may be extended outwardly from the surface of the mold section and the flats 140 on the posterior mold section 130 may be recessed inwardly from the surface of the mold section. When the anterior mold section 110 and posterior mold section 130 are assembled together, the outwardly extending flats 140 of anterior mold section 110 are received in the recessed flats 140 of posterior mold section 130, thus fixing the rotational orientation of the assembled mold sections.

Producing the flats 140 and locating the tool in the molding apparatus in the correct orientation may be achieved by modification of the tooling that forms the non-lens portion of the mold. Features 40 of anterior insert 10 and posterior insert 30 include contours corresponding to the flats 140 of mold sections 110 and 130.

Figure 4A:
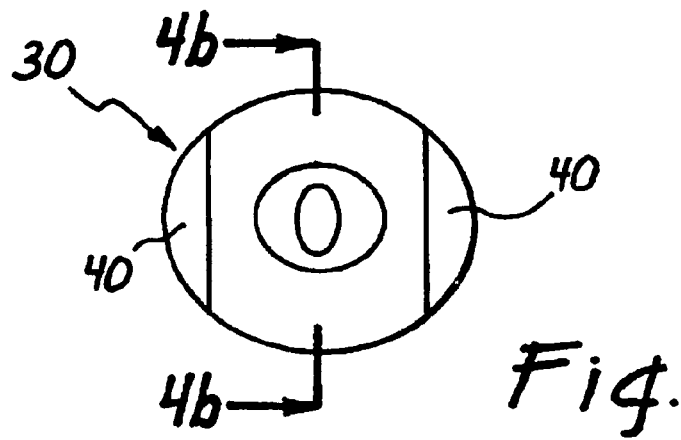
FIGS. 4a and 4b show front and cross sectional views, respectively, of an insert tool secured in a molding machine in a desired rotational position.
Figure 4B:
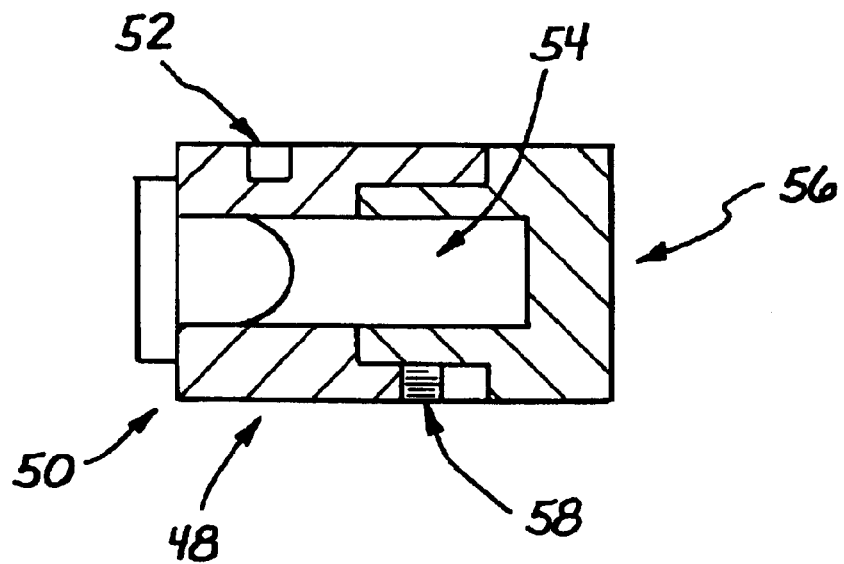

FIGS. 4a and 4b show schematically how the insert tool could be rotated within the molding apparatus.

The front portion 48 of the component 50 has on it the forms or features 40 that produce the flats 140 on the posterior mold section 130. The complete assembly is retained within a conventional molding apparatus or machine using retaining screw hole 52. Since both the above-noted features 40 and the retaining screw hole 52 are in the same portion 48 of component 50 when placed in the molding apparatus, the flats 140 will always be in the same orientation relative to the gate of the posterior mold section 130 produced. The insert tool 54, in this case for the posterior surface of the contact lens, is fixed in the back portion 56 of the component 50. Front and back portions 48 and 56, respectively, can then be rotated relative to one another to give the required axis orientation. These two portions 48 and 56 are then locked in place using grub screw 58.

With the above arrangement, changing the axis orientation requires the component 50 to be removed from the molding apparatus, grub screw 58 loosened and front and back portions 48 and 56 rotated to give the new required axis orientation. The operation is completed by re-tightening grub screw 58, re-inserting the component 50 into the molding apparatus and locking back in the machine by penetration of the retaining screw (not shown) in the molding apparatus into retaining screw hole 52.

It is recognized that a similar arrangement could be employed for either anterior or posterior surface tools or both to produce the required cylinder axes.

It is also recognized that the molding apparatus could be modified to produce a mold that is non-rotationally symmetric and the tool rotated within.

Thus, in general, in accordance with a method of the invention, by rotating the posterior insert 30 in the mold making apparatus, posterior molds sections 130 defining a variety of predetermined angles of toric orientation may be produced. On the other hand, for producing an anterior mold section 110, the anterior insert 10 is fixed in the mold making apparatus such that an index form, (e.g. the gate) is always vertical with respect to the ballast 22. On assembly of the mold sections 110 and 130, it is ensured that the two index forms, that is the flats 140, are aligned and therefor the contact lens produced will have the correct, predetermined toric axis.

While this invention has been described with respect to various specific examples and embodiments, it is to be understood that the invention is not limited thereto and that it can be variously practiced with the scope of the following claims.

What is claimed is:

1. A set of mold sections useful in molding a contact lens, the set comprising:
   a plurality of first contact lens mold sections, each first mold section including a contour which corresponds to a ballast portion of a contact lens; and
   a plurality of second, single piece contact lens mold sections, each second mold section including a contour which corresponds to a toric optical zone of a contact lens, each combination of a first mold section and a second mold section being adapted to be assembled in only a single rotational orientation and being structured to produce a contact lens, provided that the rotational orientation of the contour which corresponds to the toric optical zone of a contact lens of each second mold section in an assembled first mold section/second mold section combination is different.

2. The set of claim 1 wherein the first and second mold sections include corresponding forms adapted to facilitate locking each combination of a first mold section and a second mold section in the single rotational orientation.

3. The set of claim 1 wherein the first and the second mold sections include corresponding forms adapted to lock each combination of a first mold section and a second mold section in the single rotational orientation.

4. The set of claim 3 wherein the corresponding forms comprise mating forms.

5. The set of claim 3 wherein the corresponding forms comprise corresponding flats.

6. The set of claim 1 wherein each of the first contact lens mold sections includes a contour which corresponds to a desired spherical vision correction zone of a contact lens.

7. The set of claim 1 wherein, in each first mold section, the contour which corresponds to the ballast portion of a contact lens is the same.

* * * * *

Disclaimer and Dedication

6,732,993 B2—Gregg A. Dean, Southampton (GB). MOLD FOR MAKING CONTACT LENSES. Patent dated May 11, 2004. Disclaimer filed January 12, 2012, by the assignee, Coopervision International Holding Company, LP.

Hereby disclaims and dedicates to the public, all claims 1-7 of said patent.

*(Official Gazette, February 14, 2012)*